Patented Sept. 29, 1942

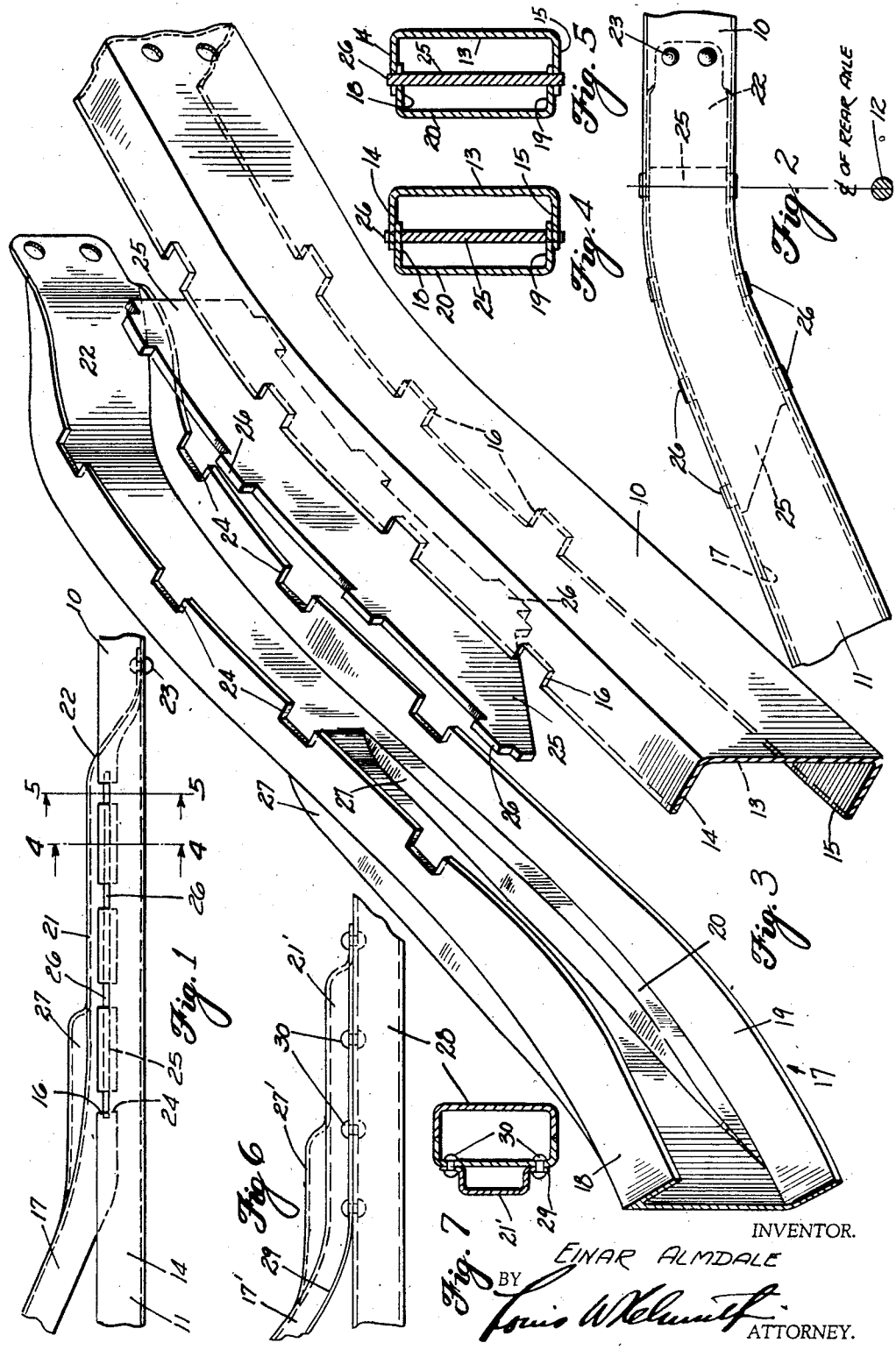

2,297,123

UNITED STATES PATENT OFFICE 2,297,123

AUTOMOBILE FRAME

Einar Almdale, Detroit, Mich., assignor to The Midland Steel Products Company, Cleveland, Ohio, a corporation of Ohio Application May 7, 1940, Serial No. 333,725

9 Claims. (Cl. 280—106)

This invention relates to structural members of vehicle frames and an important object of the invention is to provide means for forming such members into hollow box section having greater torsional resistance and beam strength than present box section members.

Another object of the invention is to provide a hollow section member with strut means extending through the hollow section which also serve to fasten together the members forming the hollow section.

A further object of the invention is to provide reinforcements for the rear kickup portions of the frame by making use of the end of a cross member which is formed to increase the hollow section at the juncture of the cross member with the rail and where the rear kickups of the frame are of smaller section and receive the greatest stress.

Other objects and advantages of the invention will become apparent during the course of the following description.

In the accompanying drawing forming a part of the application and wherein like numerals are employed to designate like parts throughout the several views, Fig. 1 is a top plan of the section of an automobile side rail over the rear axle of the vehicle, Fig. 2 is a side elevation of the same, Fig. 3 is an enlarged exploded view of this portion of the frame, Fig. 4 is an enlarged transverse section taken on the line 4—4 of Fig. 1, Fig. 5 is a similar view taken on the line 5—5 of Fig. 1, Fig. 6 is a top plan of the same portion of the frame as is shown in Fig. 1 and illustrating a modified construction, Fig. 7 is a transverse section of the same.

Referring more particularly to the drawing, the numeral 10 designates that portion of a longitudinally disposed side rail 11 of an automobile frame which is offset from the rest of the rail in a vertical direction to form what is commonly known as a kickup to be disposed over the rear axle 12 of the motor vehicle. Each side rail of the frame is composed of a light gauge inwardly facing channel member having a vertical web 13 and upper and lower horizontal flanges 14 and 15 respectively. As is usual in the side rails of vehicle frames, the major portions thereof are of much greater depth or web height than the relatively smaller sections in the kickup portions, and this is especially true of the kickup portions of the frame which are disposed over the rear axle and on back to the rearmost ends of the side rails. The free longitudinal edges of the upper and lower flanges 14 and 15 are provided with a plurality of rectangular notches 16 along the upwardly inclined and rearwardly extending portion of the rear kickup. As will be noted, the notches in the upper flange are staggered with relation to those provided in the lower flange.

A cross member 17 is provided for connecting the two side rails 11 in spaced parallel relationship. In this illustration, it will be noted that the cross member 17 is inclined at an obtuse angle with respect to the side rail since it forms one of the rearwardly diverging arms of the usual X-shaped cross member arranged approximately at the central portion of the frame. This arm 17 is of channel section and faces outwardly with outwardly extending horizontal flanges 18 and 19 and a connecting web portion 20. This obliquely disposed arm 17 meets the up bend of the rear kickup at a point spaced forwardly of the rear axle 12 and is continued along the same in parallel relation therewith as designated by the numeral 21. This parallel portion 21 is of a size to nest within the channel of the kickup portion of the side rail with its upper and lower flanges juxtaposed with respect to the rail flanges to be secured together to form the kickup portion into hollow completely closed box section as shown in Figs. 4 and 5. The extended end of the cross member extends along the kickup portion to a point beyond the rear axle where it is inclined inwardly as at 22 to be riveted or otherwise secured to the web 13 of the side rail by means of the rivets 23. The upper and lower flanges of this cross member which are nested within the channel of the kickup portion are provided with rectangular notches 24 complementary to the notches 16 to cooperate therewith in forming openings when the members are nested.

In order to increase the strength of this box section formation, a vertical strut plate of heavier gauge than the side rail and cross member is shaped to the curvature of the kickup and has its upper and lower edges provided with welding lugs 26 arranged in the same plane therewith and in staggered relationship to be received in the openings formed by the cooperation and registration of the notches 16 and 24. These lugs are of such height as to project through upper and lower lapped flanges and beyond the outermost so as to be welded or burned down to fuse the metal at the ends thereof with the edges of the openings and thus rigidly secure the parts in permanent position. It will be noted that the strut plate 25 is arranged off of the neutral axis of the section and effectively unites the outermost fibers of the upper and lower flanges to form a better torsion resisting hollow section.

In order to reinforce and build up the strength of the box section and the inwardly curved portion of the cross member where it joins with the up bend of the side rails and increase the area of the section the web portion 20 is pressed or formed outwardly as at 27 and gradually merges at its forward end into the web portion which inclines away from the side rail as best seen in Fig. 1. This construction increases the area of the box section formation at the juncture of the cross member and side rail.

In Figs. 6 and 7 is shown a modification of the idea wherein the side rail 28 is of uniform box section throughout its entire length and may be made by any known method. The cross member 17' in this instance corresponds with that shown in Fig. 1 with the exception that its horizontal flanges terminate in vertical flanges 29 which are riveted as at 30 or otherwise secured to the inner web portion of the rail in the same area of the kickup as that shown in the remaining figures of the drawing to form a double box section.

While I have described and illustrated the two forms of invention, it will be apparent to those skilled in the art that various changes, omissions, additions and substitutions may be made therein without departing from the spirit of the invention or the scope of the appended claims.

I claim:

1. In an automobile frame, a hollow light gauge closed box section side rail, a vertical web strut of heavier gauge spaced from its side walls and extending through the sections at one side of its neutral axis and close thereto to increase its torsional resistance and to divide it into several box sections.

2. In an automobile side rail of hollow light gauge completely closed box section with a kickup portion of smaller area than the intermediate portion of the rail, a vertical web strut of heavier gauge extending longitudinally through the smaller area section to one side of its neutral axis to increase its torsional resistance and provided with shoulders to support opposite sides of the box section.

3. A structural member comprising a pair of channel sections arranged with their flanges extending toward one another, the flanges being correspondingly notched whereby the notches of the two sections are complementary to provide openings, and a strut arranged vertically between the two sections and having its edges provided with lugs extending through said openings and welded to the edges thereof.

4. A structural member comprising a pair of closed channel sections arranged with their webs spaced apart and their flanges correspondingly notched and overlapped to bring the notches into registration to provide openings, and a strut member arranged between the channels and provided on opposite margins with lugs extending through the registering notches and being welded to the edges thereof to unite the flanges, and the portions of the strut between its lugs forming the support for the overlapped flanges of the channel sections.

5. A structural member comprising a pair of channel sections having the free margins of their flanges correspondingly notched to register and provide openings when the sections are nested one inside of the other with their open channels facing each other and their flanges overlapping to provide a closed box section, and a strut having both longitudinal edges provided with lugs arranged in staggered relation and extending through said openings provided in said overlapped flanges and welded to the edges of said openings.

6. In an automobile frame, a longitudinal side rail of channel section having an extensive vertical offset portion or kickup, of means for increasing the torsional strength of said offset portion comprising a channel section reinforcement arranged in opposed relation to the channel of the rail and with its flanges arranged in overlapped relation with the flanges of the rail to form the offset portion into box section, said overlapped flanges having registering openings therein, and a vertical strut forming a wall between the overlapped flanges and having lugs extending from opposite edges to project through the openings in the overlapped flanges and being welded thereto to unite the same.

7. In an automobile frame, a longitudinal side rail of channel section having an extensive vertical offset portion or kickup, of means for increasing the torsional strength of the up-bend of said offset portion comprising a channel section reinforcement extending at an angle to the rail and having a portion arranged in opposed relation to the channel of the rail with its flanges secured to the flanges of the rail to form the up-bend of the offset portion into box section, and said portion of said channel section reinforcement having its web portion formed with an outwardly pressed rib at a point beginning where the reinforcement meets the side rail to provide a box section of greater area than is provided by only the rail and reinforcement.

8. In an automobile frame, a longitudinal rail, a cross member of channel section having an angular end bent to extend parallel with the rail and having its flanges secured to the rail, and the web portion of the cross member having a pressed out rib at the bend thereof where it merges into the rail to strengthen and increase the area of the section at that point.

9. A structural member for a part of an automobile chassis, comprising a hollow light gauge unitary member of completely closed box section, and a heavier gauge web strut coextensive with the same and extending lengthwise inside of the box section on one side of its neutral axis, said strut being secured to opposite sides of the box section and spaced from the other two opposite sides of the box section to increase its torsional resistance and to divide it into several separate hollow sections.

EINAR ALMDALE.